(12) United States Patent
Sarwar et al.

(10) Patent No.: US 12,481,894 B1
(45) Date of Patent: Nov. 25, 2025

(54) FEDERATED ON-SENSOR LEARNING FOR LOCAL DEVICE ADAPTATION AND GLOBAL IMPROVEMENT OF MACHINE LEARNING MODEL

(71) Applicant: META PLATFORMS TECHNOLOGIES, LLC, Menlo Park, CA (US)

(72) Inventors: Syed Shakib Sarwar, Bellevue, WA (US); Barbara De Salvo, Belmont, CA (US); Xinqiao Liu, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 964 days.

(21) Appl. No.: 17/666,455

(22) Filed: Feb. 7, 2022

(51) Int. Cl.
| | | |
|---|---|---|
| *G06N 3/08* | (2023.01) | |
| *G06F 3/01* | (2006.01) | |
| *G06F 16/23* | (2019.01) | |
| *G06N 3/00* | (2023.01) | |
| *G06N 3/098* | (2023.01) | |

(Continued)

(52) U.S. Cl.
CPC ............ *G06N 3/098* (2023.01); *G06F 3/016* (2013.01); *G06F 16/2379* (2019.01); *G06N 3/002* (2013.01); *G06N 3/08* (2013.01); *H04L 63/0428* (2013.01); *A61B 5/486* (2013.01); *G06N 3/047* (2023.01); *G16H 10/60* (2018.01); *H04L 9/3263* (2013.01)

(58) Field of Classification Search
CPC ............... H04L 63/0428; H04L 9/3263; G06F 16/2379; G06F 3/016; G06N 3/002; G06N 3/08; G06N 3/098; G06N 3/047; H04R 5/033; G16H 10/60; G10H 1/0025; A61B 5/486; B60K 35/81; H04W 12/037
See application file for complete search history.

(56) References Cited

U.S. PATENT DOCUMENTS

| | | | | |
|---|---|---|---|---|
| 2014/0316191 | A1* | 10/2014 | de Zambotti | A61B 5/486 600/27 |
| 2016/0056964 | A1* | 2/2016 | Andiappan | H04L 9/3263 713/189 |

(Continued)

OTHER PUBLICATIONS

KR 20150035971 (translation), Apr. 7, 2015, 10 pgs <KR_20150035971.pdf>.*

(Continued)

*Primary Examiner* — Tuan A Vu
(74) *Attorney, Agent, or Firm* — Freestone Intellectual Property Law PLLC; Aaron J. Visbeek

(57) ABSTRACT

An artificial reality system performs local user adaptation of machine learning models and global improvement of the machine learning models while ensuring data security and privacy. An artificial reality headset uses smart sensors and a system on chip (SoC). The smart sensor extracts features from sensor data, encrypts them and transmits the encrypted features to the SoC of the headset. The SoC provides the encrypted features to a server, for example, a server in a cloud platform. The server updates a base model with collected features and sends the updated base model parameters to headsets. The smart sensors of a headset receiving the updated model parameters, balance the model parameters with locally stored feature data, for example, user calibration features to perform user customization of the machine learning model.

20 Claims, 9 Drawing Sheets

(51) Int. Cl.
*H04L 9/40* (2022.01)
*A61B 5/00* (2006.01)
*G06N 3/047* (2023.01)
*G16H 10/60* (2018.01)
*H04L 9/32* (2006.01)

(56) References Cited

U.S. PATENT DOCUMENTS

| | | | |
|---|---|---|---|
| 2018/0193589 A1* | 7/2018 | McLaughlin | G06F 3/016 |
| 2019/0038964 A1 | 2/2019 | Veeramani et al. | |
| 2020/0151611 A1 | 5/2020 | McGavran et al. | |
| 2020/0185073 A1* | 6/2020 | De Brouwer | G16H 10/60 |
| 2021/0117859 A1 | 4/2021 | Rogers et al. | |
| 2021/0166077 A1 | 6/2021 | Yu et al. | |
| 2021/0232981 A1 | 7/2021 | Sundaresan | |
| 2022/0172424 A1* | 6/2022 | Vircíková | G06N 3/047 |

OTHER PUBLICATIONS

Anonymous, "Learning to Balance with Incremental Learning," International Conference on Learning Representations (ICLR), 2021, 8 pages.

Carpenter G.A., et al., "Fuzzy ARTMAP: A Neural Network Architecture for Incremental Supervised Learning of Analog Multidimensional Maps," IEEE Transactions on Neural Networks, in press, Aug. 1991, 40 pages.

Chen Z., "Continual Learning and Catastrophic Forgetting," Chapter 4, Lifelong Machine Learning, Morgan & Claypool Publishers, 2018, pp. 55-75.

Chen Z., et al., "Synthesis Lectures on Artificial Intelligence and Machine Learning," Lifelong Machine Learning, Morgan & Claypool Publishers, 2016, 145 pages.

Dong Q., et al., "Imbalanced Deep Learning by Minority Class Incremental Rectification," ArXiv:1804.10851v1, Apr. 28, 2018, 14 pages.

Hu W., et al., "Overcoming Catastrophic Forgetting for Continual Learning via Model Adaptation," International Conference on Learning Representations (ICLR), 2019, 13 pages.

Luo Y., et al., "An Appraisal of Incremental Learning Methods," Entropy, Oct. 22, 2020, vol. 22, No. 1190, 27 pages.

Polikar R., et al., "Learn++: An Incremental Learning Algorithm for Supervised Neural Networks," IEEE Transactions on Systems Man and Cybernetics Part C (Applications and Reviews), Nov. 2001, vol. 31, Issue No. 4, pp. 497-508.

Wikipedia, "Federated Learning," Retrieved on Jan. 28, 2022, 15 pages, Retrieved from Internet: URL: https://en.wikipedia.org/wiki/Federated_learning.

Wu Y., et al., "Large Scale Incremental Learning," Computer Vision and Pattern Recognition (CVPR), pp. 374-382.

\* cited by examiner

500

Receive parameters of machine learning model
510

Receive sensor data
520

Modify the machine learning model based on received sensor data
530

Repeat

Send encrypted parameters/feature data to SoC
540

Receive updated base model/model parameters from SoC
550

Locally update the received base model/model parameters based on stored feature values
560

700

Receive training data for training the machine learning model
710

Train machine learning model
720

Send trained machine learning model to SoC of headsets
730

Repeat

Receive parameters/feature data from headsets
740

Update the base model using the received parameters/feature data
750

Send the updated model/model parameters to the SoCs of the headsets
760

FIG. 7

FEDERATED ON-SENSOR LEARNING FOR LOCAL DEVICE ADAPTATION AND GLOBAL IMPROVEMENT OF MACHINE LEARNING MODEL

FIELD OF THE INVENTION

This disclosure relates generally to training of machine learning models, and more specifically to local adaptation of machine learning models on a sensor while performing global improvement on a server.

BACKGROUND

A system, such as a headset and console system, that uses virtual reality, an augmented reality, or a mixed reality often uses machine learning models, for example, neural networks. Machine learning models are used to produce information for the users or to gain insight about the way a user is interacting within the environment. Machine learning models are typically trained on a server and transmitted to client devices or other systems, for example, the headsets used for artificial reality to execute the models. The server receives and stores training data that is used for training the machine learning models. For certain applications, the machine learning based models need to be trained using data collected on a client device that may include sensitive information for example raw images. Accordingly, due to privacy concerns, users may prefer not to share raw images that may be is useful for training the machine learning models. For such applications, the server may not have adequate training data for training the machine learning models. If a machine learning model is trained using inadequate data, the accuracy of prediction of the machine learning model is poor.

SUMMARY

An artificial reality system uses smart sensors and a system on chip (SoC) to perform local adaptation of machine learning models. The smart sensors include computing resources that can perform compute operations, for example, incremental training of a machine learning model. A server collects data from multiple headsets to update a base model that is provided to the headsets. The headset adapts the base model based on locally stored feature data. The system enforces privacy of user data by either sending encrypted feature data or encrypted parameters to the server. The system performs local user adaptation and global improvement of machine learning models while ensuring data security and privacy.

According to an embodiment, the smart sensor of an artificial reality headset receives parameters of a machine learning model, for example, parameters of a machine learning model initially trained on a server. The smart sensor receives sensor data captured by a sensor hardware within the smart sensor and stores features data extracted from the sensor data. The smart sensor updates the machine learning model based on the feature data that is locally stored.

The headset repeatedly performs the following steps to update the machine learning model. The smart sensor sends encrypted data associated with the machine learning model to a SoC of the artificial reality headset. The encrypted data may include encrypted feature data or encrypted parameters of the machine learning model. The SoC of the headset receives the encrypted data from one or more smart sensors of the headset. The SoC sends the encrypted data collected from the one or more smart sensors to a server. The server collects encrypted data from multiple headsets and updates a base machine learning model using the collected data. The SoC receives parameters of the updated base machine learning model from the server and sends the parameters of the base machine learning model to one or more smart sensors on the headset. Each smart sensor locally updates the received base machine learning model based on locally stored feature data. The system enforces privacy of user data on artificial reality headsets while allowing periodic updates to the machine learning models used by the headset while performing local adaptation.

BRIEF DESCRIPTION OF THE DRAWINGS

FIG. 7 shows a flowchart of a process executed by the server according to an embodiment.

Figure 1:
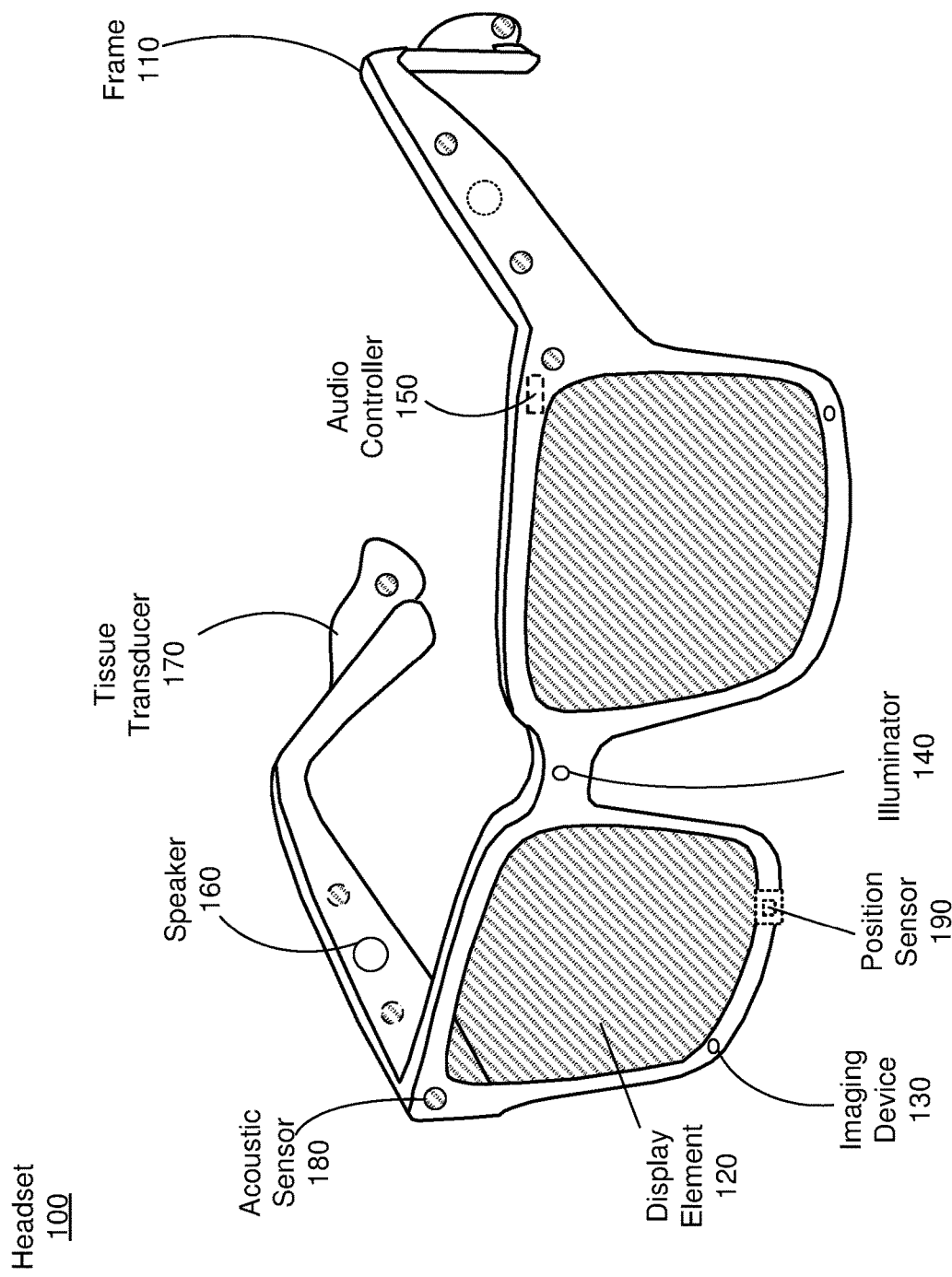
FIG. 1 is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Artificial reality headsets often use machine learning models, for example, neural networks for performing tasks such as eye tracking and hand tracking. The artificial reality headset receives a machine learning model that may be trained off-line, for example, by a server. The system ensures privacy of data collected and stored at the artificial reality headset while providing user customization at smart sensors of the headset and model generalization in a server.

To perform customization, the smart sensor of the headset may capture calibration frames. If the calibration frames are sent by the smart sensor to the server on cloud, there are security concerns due to increased likelihood of privacy breach since raw input images captured by the headset are being transmitted over the network. Therefore, to allow local user adaptation and global model improvement while ensuring data security and privacy, the system uses federated learning in smart sensors. A smart sensor includes compute resources that allow the smart sensor to perform local customization of machine learning models. The smart sensor extracts features from sensor data, encrypts them and transmits the encrypted features to the SoC of the headset. The SoC provides the encrypted features to a server, for example, a server in a cloud platform. The server receives such features from multiple headsets and decrypts them. The server updates a base model with the collected features. The server sends the updated base model parameters periodically to all headsets. This transmission may also be done with encryption. If the model structure changes, information describing the new structure may be sent without encryption, while the model parameters are encrypted before sending. When the updated model parameters reach the headset, the smart sensor balances the model parameters with locally stored feature data, for example, user calibration features to perform user customization of the machine learning model. Although the techniques disclosed herein are described in relation to an artificial reality headset, the techniques are applicable to any other device that includes smart sensors and an SoC.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1 shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 4A:
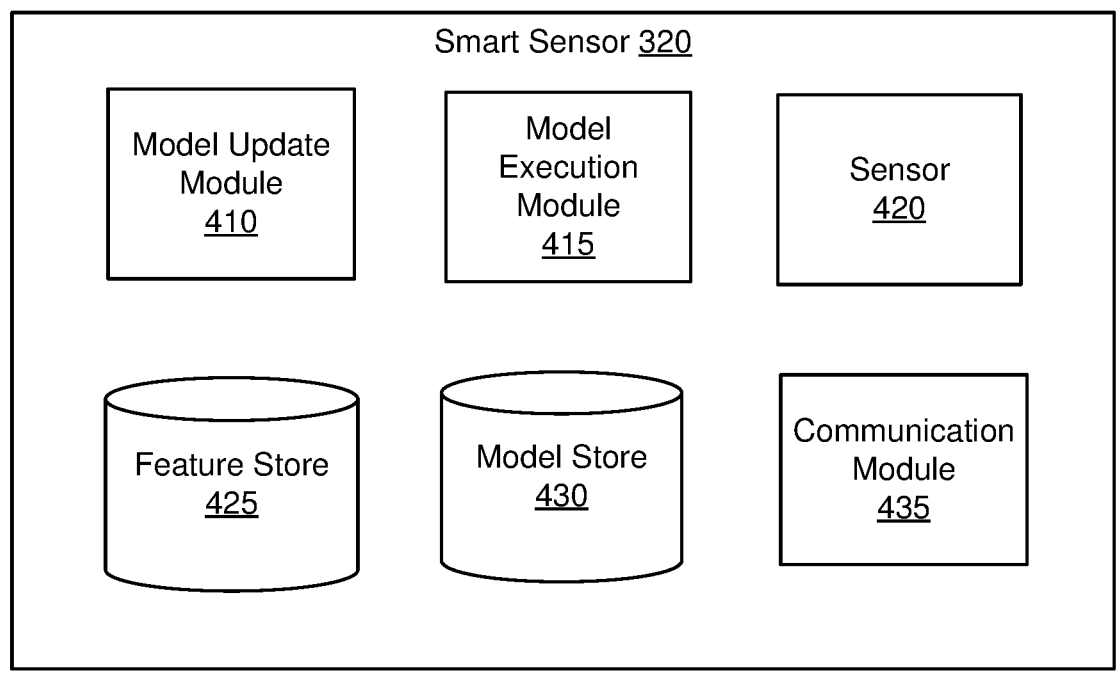
FIG. 4A illustrates architecture of smart sensor of a headset according to an embodiment.
Figure 4B:
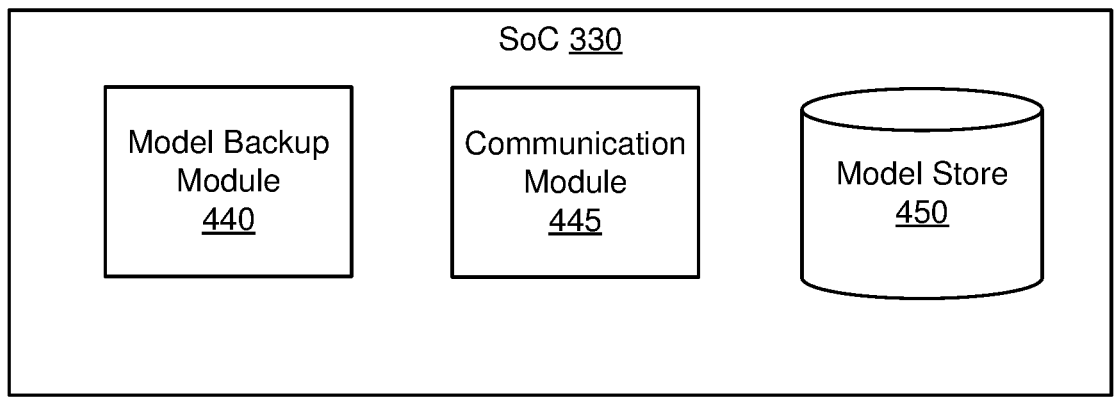
FIG. 4B illustrates architecture of SoC of a headset according to an embodiment.

According to an embodiment one or more sensors installed on a headset are smart sensors. A smart sensor includes computing resources to perform certain functions, for example, calibration of the camera. The computing resources may be provided using a processor installed on the smart sensor. The smart sensor may store software modules for performing specific functions. The headset may have multiple smart sensors, for example, the headset may have two smart sensors for each eye camera or 4 smart sensors for hand tracking. The headset includes an SoC that interacts with the smart sensors. The SoC also includes computing resources and stores software modules for performing specific functions. An example architecture of a smart sensor is shown in FIG. 4A and an example, architecture of the SoC is shown in FIG. 4B.

Figure 2:
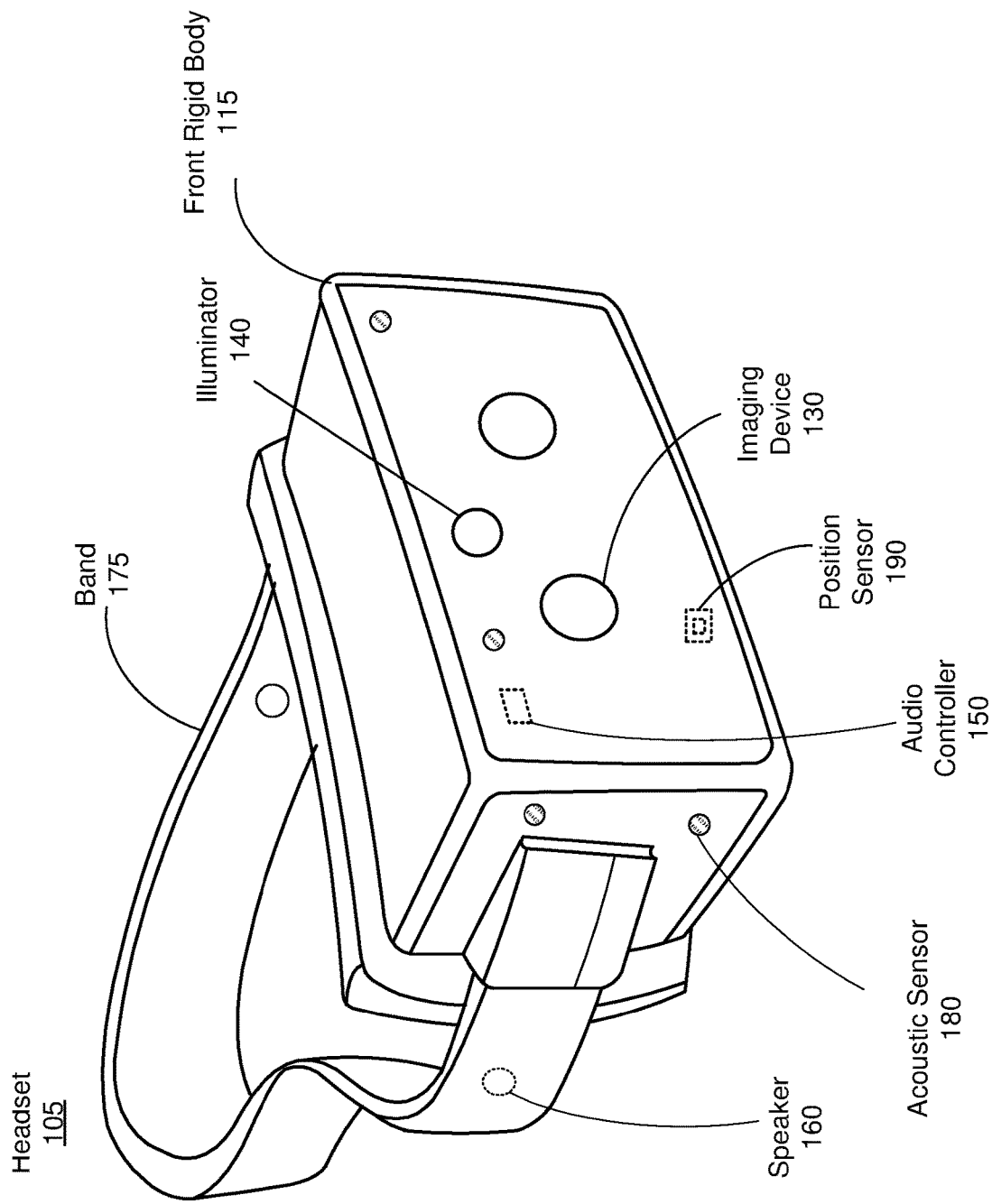
FIG. 2 is a perspective view of a headset implemented as a head-mounted display, in accordance with one or more embodiments.

FIG. 2 is a perspective view of a headset 105 implemented as a HMD (head-mounted display), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1, but modified to integrate with the HMD form factor. For example, the HMD includes a display assembly, a DCA, an audio system, and a position sensor 190. FIG. 2 shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 3:
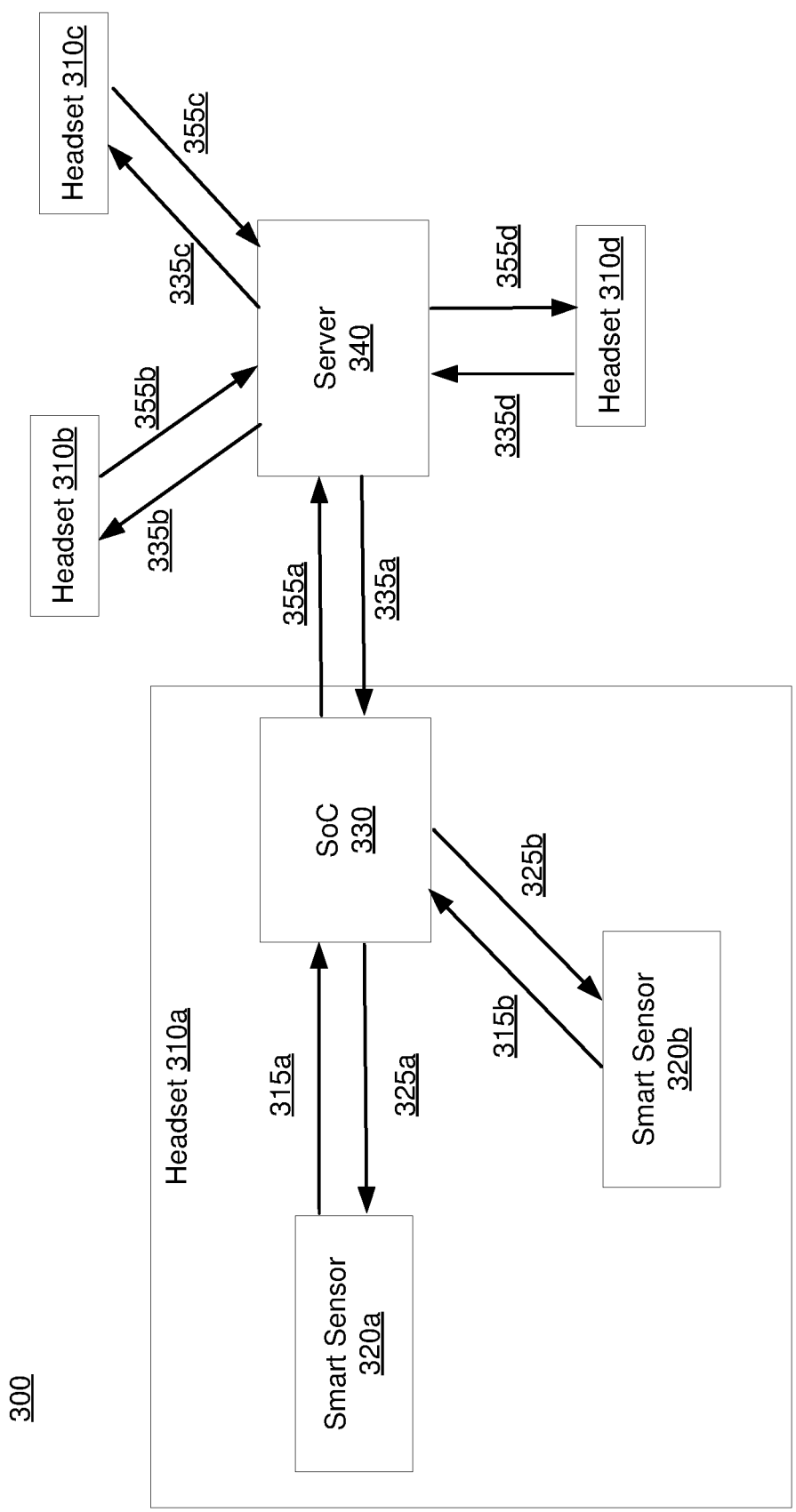
FIG. 3 illustrates interactions between components of a headset and a server according to an embodiment.

FIG. 3 illustrates interactions between components of a headset and a server according to an embodiment. The system environment 300 shown in FIG. 3 includes a server 340 that interacts with a plurality of headsets, for example, headset 310a, 310b, 310c, 310d, 310e, and so on. The server 340 performs an initial training of a machine learning model to generate a base model and provides the base model to the headsets 310. The server 340 subsequently receives 355 data associated with the machine learning models, for example, parameters or feature data from multiple headsets and updates the base model. The server 340 provides 335 the updated base model/model parameters to the headsets 310. The interactions 355 and 335 are performed with each headset, for example, interaction 355a and 335a with headset 310a, interaction 355b and 335b with headset 310b, interaction 355c and 335c with headset 310c, interaction 355d and 335d with headset 310d, and so on.

FIG. 3 and the other figures use like reference numerals to identify like elements. A letter after a reference numeral, such as "320a," indicates that the text refers specifically to the element having that particular reference numeral. A reference numeral in the text without a following letter, such as "320," refers to any or all of the elements in the figures bearing that reference numeral (e.g., "320" in the text refers to reference numerals "320a", "320b", and/or "320n" in the figures).

The headset 310 includes an SoC 330 and one or more smart sensors 320. A smart sensor 320 locally updates the machine learning model using the data stored on the smart sensor. The headset may include multiple smart sensors 320a, 320b. A reference to a smart sensor 320 describes sensors 320a, 320b, and so on. The smart sensor 320 sends 315a, 315b the update parameters or feature data to the SoC 330. The SoC 330 sends 355 the received parameters/feature data to the server 340. The SoC 330 receives 335 parameters of an updated base model/model parameters from the server 340. The SoC sends 325 the updated base model/model parameters to the smart sensors 320 of the headset 310.

FIG. 4A illustrates architecture of smart sensor of a headset according to an embodiment. The smart sensor includes a model update module 410, a model execution module 415, a sensor 420, a feature store 425, a model store 430, and a communication module 435. Other embodiments of a smart sensor 320 may include more or fewer modules.

The sensor 420 represents a device of the smart sensor 320, for example, a camera or a hand tracking sensor. The sensor 420 represents the portion of the smart sensor 320 that captures the sensor data and provides to the remaining components of the smart sensor, for example, to feature store 425 for storing the data.

The model store 430 stores parameters of machine learning models. Examples of machine learning models that may be executed by the smart sensor 320 of an artificial reality headset include machine learning models used for eye tracking and hand tracking. In an embodiment, the smart sensor 320 receives the parameters of a machine learning model from the SoC 330 which in turn receives the model from the server 340.

The model execution module 415 executes the machine learning models stored in the model store 430. For example, the model execution module 415 may receive sensor data from eye tracking sensors and execute the machine learning model to perform eye tracking. As another example, the model execution module 415 may receive sensor data from hand tracking sensors and execute the machine learning model to perform hand tracking The feature store 425 stores features that are provided as input to the machine learning models for execution or for incremental training. The data stored in the feature store may include sensor data or features extracted from sensor data.

The data stored in feature store may include user input received for calibration of the machine learning model. For example, the headset may display certain image and ask the user to look at the image. The headset tracks the eye movement when the user looks at the image to perform calibration.

The model update module 410 updates the machine learning model that is obtained from the SoC 330 or the server 340. In an embodiment, the model update module 410 performs incremental training of the model received based on sensor data or other information that is locally stored in the feature store 425.

The communication module 435 performs communications with other systems. For example, the communication module 435 performs communications with the SoC 330. The communication module 435 sends data in encrypted form to the SoC 330. For example, the communication module 435 may send encrypted features from the feature store or parameters of a machine learning model that is modified by the model update module 410 to the SoC 330. The communication module 435 sends data to the SoC 330 for storing as a backup or for providing to the server 340.

FIG. 4B illustrates architecture of a SoC 330 of a headset according to an embodiment. The SoC 330 includes a model backup module 440, a communication module 445, and a model store 450. Other embodiments of an SoC 330 may include more or fewer modules.

The model backup module 440 receives machine learning models that are updated by individual smart sensors 320 of the headset and performs backup of the machine learning models by storing the model backups in the model store 450. The communication module 445 allows the SoC 330 to communicate with the smart sensors and the server 340. The communication module 445 receives values associated with a model, for example, features or model parameters from smart sensors and sends them to the server 340. The communication module 445 also receives an updated base model/model parameters from the server 340 and sends it to the smart sensors 320.

In some embodiments, the SoC combines features from multiple smart sensors and performs a partial update of the machine learning model. For example, the SoC may receive eye-tracking features from two or more eye-tracking sensors and combine the features to update the machine learning model to achieve higher incremental learning accuracy while performing eye-tracking. Similarly, the SoC may receive hand-tracking features from two or more hand-tracking sensors and combine the features to update the machine learning model to achieve higher incremental learning accuracy while performing hand tracking. The SoC may provide the updated model to each of the smart sensors that provided the features. In some embodiments, the SoC facilitates inter smart sensor communication. For example, a smart sensor S1 (for example, smart sensor on left side) may send data/feature to a smart sensor S2 (for example, right side sensor) through SoC and vice-versa. This results in providing more diversity in the calibration/incremental/local learning of each smart sensor.

Figure 4C:
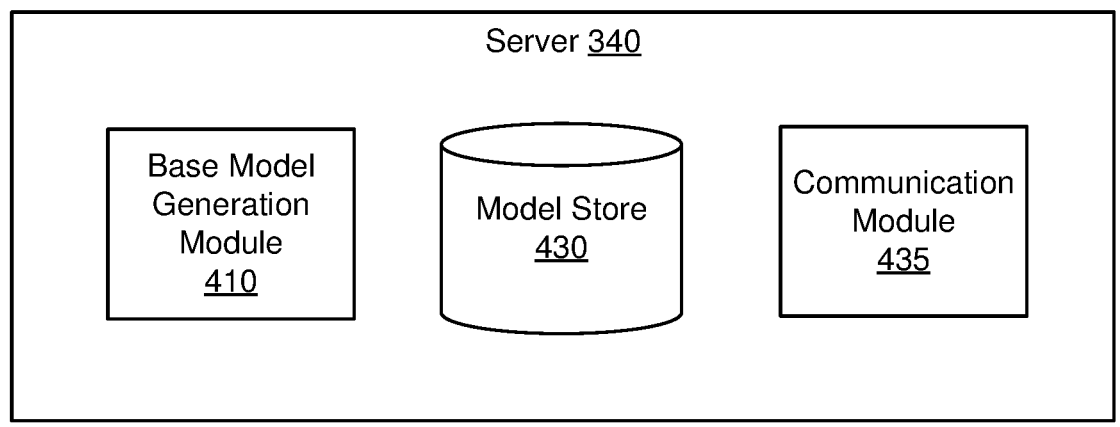
FIG. 4C illustrates architecture of server interacting with multiple headsets according to an embodiment.

FIG. 4C illustrates architecture of the server 340 interacting with multiple headsets according to an embodiment. The server 340 includes a base model generation module 410, a model store 430, and a communication module 435. Other embodiments of a server 340 may include more or fewer modules.

The communication module 435 of the server 340 receives values associated with models, for example, features or parameters of the models from SoC of various headsets 310. The server 340 stores the receives values associated with models in the model store 430. The base model generation module 410 uses the values received from the various headsets to generate a base model. For example, if the server 340 receives feature values from the various headsets, the base model generation module 410 incrementally trains the base model based on the received feature values. The incremental training retains the training based on previously received features and further trains the base model based on the new values of features received. In some embodiments, the communication module 435 of the server 340 receives updated model parameters from each of the headsets. The base model generation module 410 updates the base model based on the model parameters received from the various headsets.

In one embodiment, the server performs federated learning to update the base model based on features/parameters received from multiple headsets. The server determines parameters of the base model as an aggregate of the corresponding parameters of the plurality of models received from the plurality of headsets. For example, the aggregate operation performed by the server may be an average of parameters. In one embodiment, the models are neural networks comprising multiple layers and the server collects features determined by initial layers of the model from multiple headsets. The server uses the features of initial layers of the models collected from multiple headsets to retrain the later layers of the base model. Accordingly, the input provided to later layers of the model comprises features generated by initial layers of models obtained from multiple headsets.

In another embodiment, the server sends a subset of the updated layers/parameters of the base model to the headsets. The headsets use the received subset of layers/parameters and update a different set of layers/parameters for personalization. Accordingly, the system identifies a subset of parameters/layers of the model as generalization layers/parameters. The server only retrains the generalization parameters/layers in the base model. The headsets perform local retraining of their models for personalization layers/parameters while updating the generalization layers/parameters with updated parameters from the base model.

The communication module 435 sends the trained base model/model parameters to the SoC 330 of various headsets for further providing the base model/model parameters to their respective smart sensors 320.

Figure 5:
FIG. 5 shows a flowchart of a process executed by a smart sensor of a headset according to an embodiment.
Figure 5:
Figure 5:
Figure 5:
Figure 6:
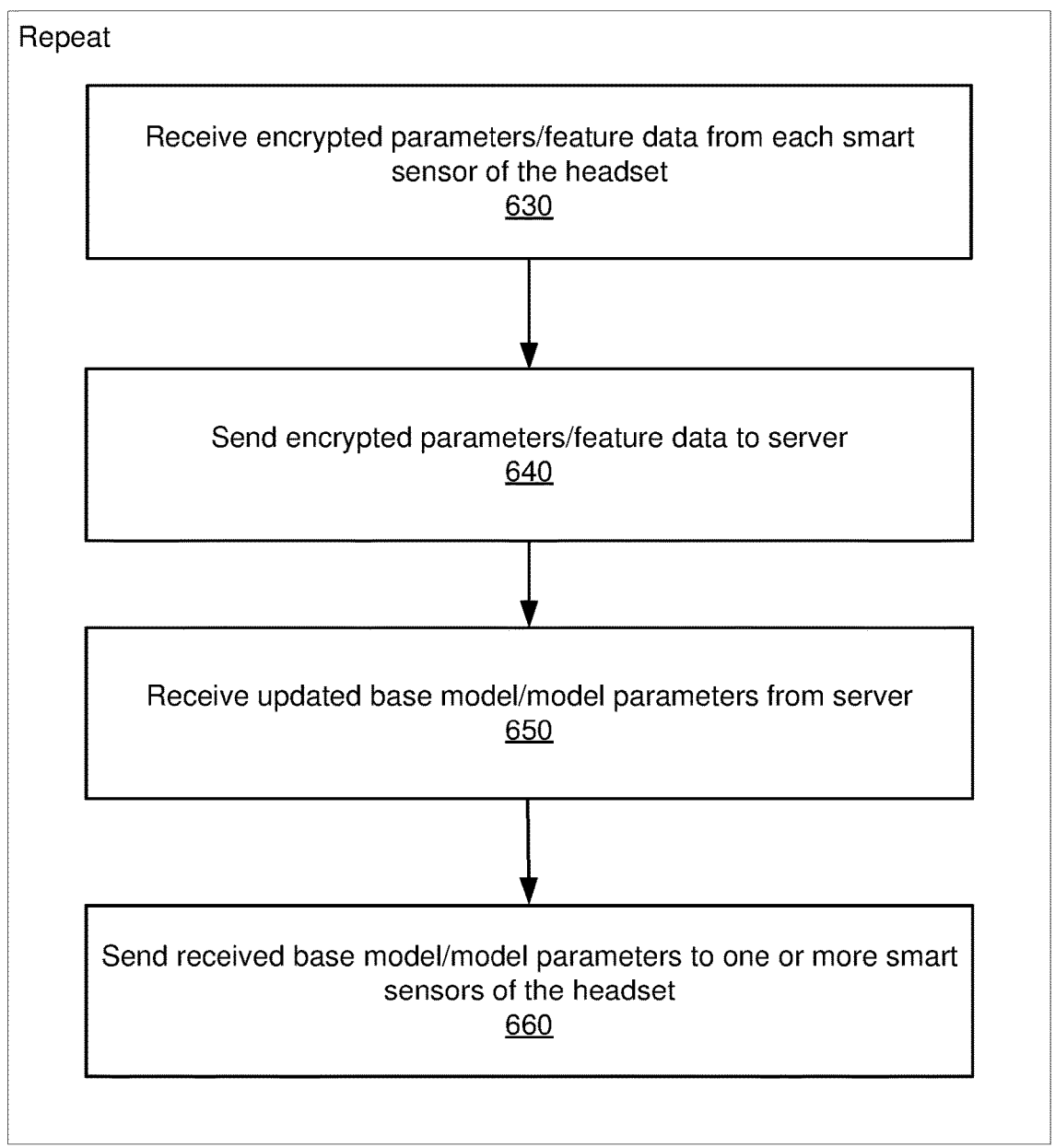
FIG. 6 shows a flowchart of a process executed by an SoC of a headset according to an embodiment.

FIGS. 5-7 show processes executed by the various systems shown in FIG. 3. The steps of each process may be executed in an order different from that shown herein.

FIG. 5 shows a flowchart of a process 500 executed by a smart sensor of a headset according to an embodiment. The smart sensor 320 receives 510 parameters of a machine learning model, for example, a machine learning model for eye tracking or for hand tracking. The smart sensor 320 may receive 510 the parameters from the SoC 330 of the headset which may further receive the parameters from a server 340. The smart sensor 320 stores the received parameters of the model.

The smart sensor 320 receives 520 sensor data from a sensor 420. The smart sensor 320 may extract features from the sensor data. The smart sensor 320 modifies 530 the parameters of the model received. For example, the smart sensor 320 may calibrate the model based on features that were previously extracted from sensor data. In an embodiment, the smart sensor performs incremental learning of the model.

The system may perform user adaptation based on various approaches. In one embodiment, the smart sensor performs transfer learning, where the system updates the final few layers with calibration images. In another embodiment, the system performs tuning (e.g., threshold tuning) of the activations using calibration images obtained by the smart sensor. In another embodiment, the system performs model adaptation. For example, the system may use curve fitting techniques where fitting parameters are generated by calibration images.

The smart sensor 320 repeats the steps 540, 550, and 560. The steps may be repeated periodically while the headset is operational. The steps may be executed at a frequency that may change over time, for example, more steps may be executed more frequently initially and at a slower rate over time. The smart sensor 320 sends encrypted values associated with the model, for example, encrypted parameters and/or feature data to the SoC 330 of the headset. The SoC 330 may send the encrypted parameters/feature data to the server and receive parameters of an updated base model from the server 340. The smart sensor 320 receives 550 parameters of the updated base model from the SoC 330. The smart sensor further locally updates 560 (i.e., modifies) the received base model using the features extracted from sensor data obtained from the sensor 420. After executing steps 560, the system repeats the steps starting from step 540.

FIG. 6 shows a flowchart of a process 600 executed by an SoC of a headset according to an embodiment. The SoC repeats the steps 630, 540, 650, and 660. The steps may be repeated periodically while the headset is operational. The steps may be executed at a frequency that may change over time. The SoC 330 receives 630 values associated with a machine learning model, for example, encrypted parameters/feature data from one or more smart sensors 320 of the headset. The SoC 330 may save the parameters and feature data locally on the model store 450. The SoC 330 sends 640 the encrypted parameters/feature data to the server 340 that uses the parameters/feature values to incrementally train the base model. The SoC 330 receives 650 parameters of the updated base model from the server 340. The SoC 330 sends 660 the received parameters to one or more smart sensors of the headset.

FIG. 7 shows a flowchart of a process 700 executed by the server according to an embodiment. The server 340 receives 710 training data for training a machine learning model, for example, model for eye tracking or hand tracking. The training data may be received from test headsets or from simulators. The server 340 trains 720 the machine learning model using the training data. The step 720 represents the initial training of the model. The server 340 sends 730 the trained model to a plurality of headsets 310.

The server 340 repeats the steps 740, 750, and 760. The steps may be repeated periodically while the headset is operational. The steps may be executed at a frequency that may change over time. The server 340 may adjust the rate depending on the amount of change in the machine learning model. For example, as a result of incremental training, if an aggregate change in the parameters of the model indicates less than a threshold change, the server may skip sending the updated model to the headsets. The server 340 receives 740 parameters/feature data from the plurality of headsets 310. The server 340 updates 750 the base model using the received parameters/feature values. For example, if the server 340 receives features data from the headsets the server 340 performs incremental training of the base model based on the feature data received from the plurality of headsets. If the server 340 receives parameters from the plurality of headsets, the server 340 may perform an aggregate operation, for example, averaging of the parameters to update 750 the base model. The server 340 sends 760 the updated base model to each of the plurality of headsets 310, for example, to the SoCs of each headset 310.

The system according to various embodiments allows local user adaptation of machine learning models used by artificial reality headsets while performing global model improvement. The system sends user environment data in encrypted form to a server for performing model generalization at the server from data collected from multiple headsets. The system receives model parameters from the server uses user features to perform user customization at the headset. The disclosed techniques allow the system to collect large amount of data from various headsets to improve the base model. The system further enforces privacy and security by allowing the server to train the based model from data obtained from headsets without transmitting raw images over the network. Since raw image data is not transmitted outside the smarty sensor, the system ensures data privacy. The system adopts encryption to move the features between smart sensors, SoC and server thereby ensuring further data privacy and security.

Figure 8:
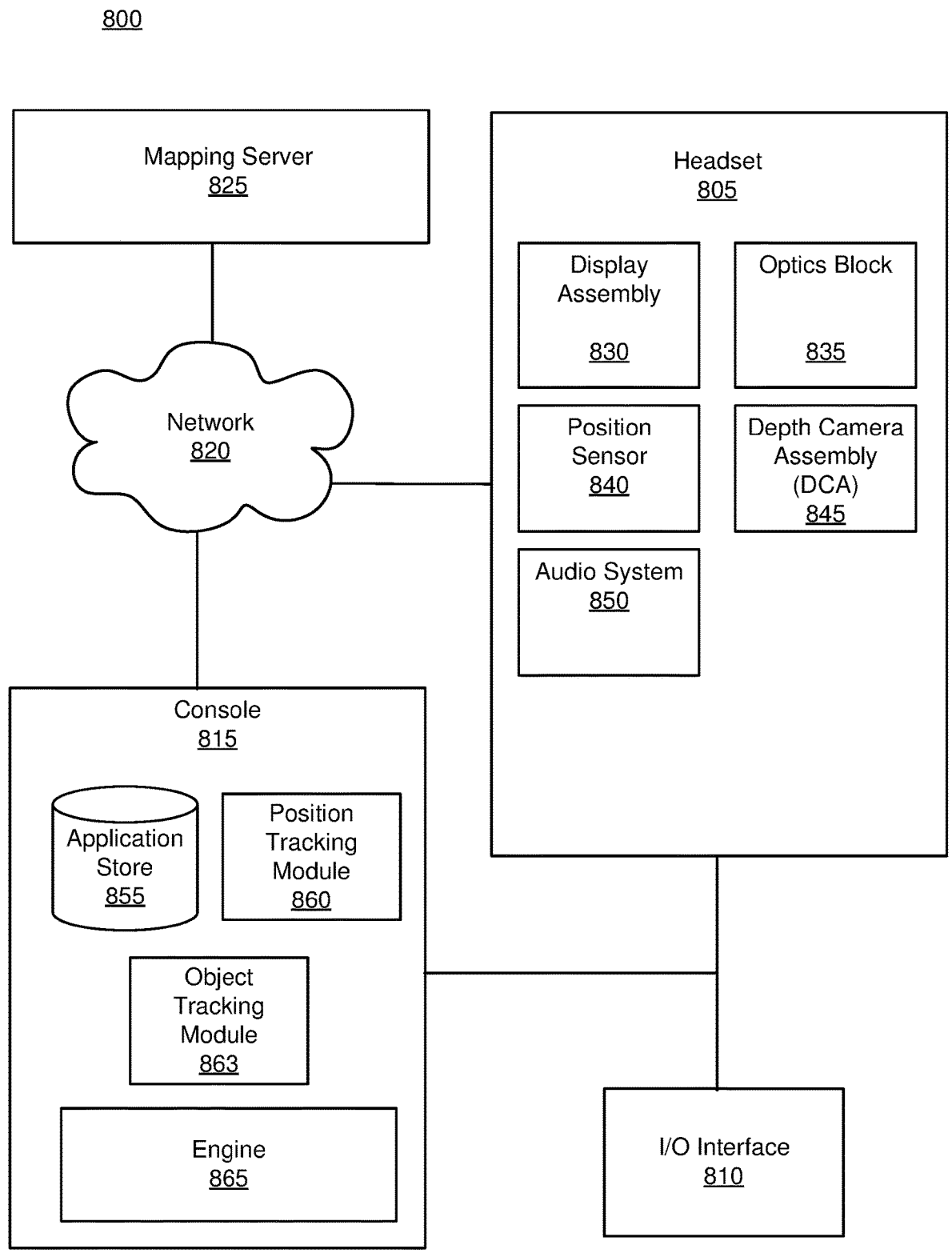
FIG. 8 illustrates a system that includes a headset, in accordance with one or more embodiments.

FIG. 8 is a system 800 that includes a headset 805, in accordance with one or more embodiments. In some embodiments, the headset 805 may be the headset 100 of FIG. 1 or the headset 105 of FIG. 2. The system 800 may operate in an artificial reality environment (e.g., a virtual reality environment, an augmented reality environment, a mixed reality environment, or some combination thereof). The system 800 shown by FIG. 8 includes the headset 805, an input/output (I/O) interface 810 that is coupled to a console 815, the network 820, and the mapping server 825. While FIG. 8 shows an example system 800 including one headset 805 and one I/O interface 810, in other embodiments any number of these components may be included in the system 800. For example, there may be multiple headsets each having an associated I/O interface 810, with each headset and I/O interface 810 communicating with the console 815. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, and the DCA 845. In some embodiments, the headset 805 includes and audio system 850. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805. The position sensor 840 may be smart sensor. The headset 805 may also include the SoC.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, corrects optical errors associated with the image light, and presents the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUs, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1.

The audio system 850 provides audio content to a user of the headset 805. The audio system 850 may comprise one or more acoustic sensors, one or more transducers, and an audio controller. The audio system 850 may provide spatialized audio content to the user. In some embodiments, the audio system 850 may request acoustic parameters from the mapping server 825 over the network 820. The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters received from the mapping server 825, and use the sound filters to provide audio content to the user.

The I/O interface 810 is a device that allows a user to send action requests and receive responses from the console 815. An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of: the DCA 845, the headset 805, and the I/O interface 810. Similarly, the functions further described below may be distributed among components of the console 815 in a different manner than described in conjunction with FIG. 8. In some embodiments, the functionality discussed herein with respect to the console 815 may be implemented in the headset 805, or a remote system. For example, the position tracking module 860 and/or the object tracking module 863 may be installed in the headset 805.

The application store 855 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The position tracking module 860 tracks movements of the headset 805 or of the I/O interface 810 using information from the DCA 845, the one or more position sensors 840, or some combination thereof. For example, the position tracking module 860 determines a position of a reference point of the headset 805 in a mapping of a local area based on information from the headset 805. The position tracking module 860 may also determine positions of an object or virtual object. Additionally, in some embodiments, the tracking module position 860 may use portions of data indicating a position of the headset 805 from the position sensor 840 as well as representations of the local area from the DCA 845 to predict a future location of the headset 805. The position tracking module position 860 provides the estimated or predicted future position of the headset 805 or the I/O interface 810 to the engine 865.

The object tracking module 863 tracks movements of objects that are detectable by sensors of the headset 100, such as the imaging device 130. For example, the object tracking module 863 may perform hand tracking computations to track the positions of a user's hands relative to the headset 100. In some embodiments, the object tracking module 863 may be used for tracking movements of other objects besides the hands of the user, such as eye tracking, or tracking, foot tracking, or item tracking. The object tracking module 863 uses information about calibration frames to adjust customized model predictions about object positions and orientations for different users. The computations of the object tracking module may be performed using neural networks.

The engine 865 executes applications and receives position information, acceleration information, velocity information, predicted future positions, or some combination thereof, of the headset 805, and predicted positions of objects from the position tracking module 860, the object tracking module 863, and from the model engine 865. Based on the received information, the engine 865 determines content to provide to the headset 805 for presentation to the user. For example, if the received information indicates that the user has looked to the left, the engine 865 generates content for the headset 805 that mirrors the user's movement in a virtual local area or in a local area augmenting the local area with additional content. Additionally, the engine 865 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 and/or the console 815 to the mapping server 825. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 825 may include a database that stores a virtual model describing a plurality of spaces, wherein one location in the virtual model corresponds to a current configuration of a local area of the headset 805. The mapping server 825 receives, from the headset 805 via the network 820, information describing at least a portion of the local area and/or location information for the local area. The user may adjust privacy settings to allow or prevent the headset 805 from transmitting information to the mapping server 825. The mapping server 825 determines, based on the received information and/or location information, a location in the virtual model that is associated with the local area of the headset 805. The mapping server 825 determines (e.g., retrieves) one or more acoustic parameters associated with the local area, based in part on the determined location in the virtual model and any acoustic parameters associated with the determined location. The mapping server 825 may transmit the location of the local area and any values of acoustic parameters associated with the local area to the headset 805.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by a smart sensor of an artificial reality headset, parameters of a machine learning model;
   updating, by the smart sensor, the machine learning model based on feature data extracted from the sensor data; and
   repeatedly performing:
      sending, by the smart sensor, encrypted data associated with the machine learning model to a system on chip (SoC) of the headset;
      receiving, by the SoC, encrypted data associated with the machine learning model from one or more smart sensors;
      sending, by the SoC, encrypted data associated with the machine learning model collected from the one or more smart sensors to a server;
      receiving, by the SoC, parameters of a base machine learning model from the server, and
      sending, by the SoC, parameters of the base machine learning model to the smart sensor; and
      locally updating, by the smart sensor, the received base machine learning model based on the stored feature data.

2. The method of claim 1, wherein encrypted data associated with the machine learning model represents encrypted feature data.

3. The method of claim 1, wherein encrypted data associated with the machine learning model represents encrypted parameters of the updated machine learning model.

4. The method of claim 3, wherein the server generates the base model by aggregating parameters received from a plurality of artificial reality headsets.

5. The method of claim 1, wherein locally updating comprises calibrating the machine learning model for a specific user.

6. The method of claim 1, wherein smart sensors and SoC are part of an artificial reality headset.

7. The method of claim 1, wherein the server:
   receives encrypted features from a plurality of headsets, decrypts the encrypted features, and updates a base machine learning model based on the decrypted features.

8. The method of claim 1, wherein the parameters of the machine learning model are received from the server as part of an initial deployment.

9. The method of claim 1, wherein the SoC stores parameters received form one or more smart sensors for backup.

10. The method of claim 1, wherein one or more smart sensors include eye tracking sensors and hand tracking sensors.

11. A non-transitory computer readable storage medium storing instructions that when executed by a computer processor, cause the computer processor to perform steps comprising:
   receiving, by a smart sensor of an artificial reality headset, parameters of a machine learning model;
   updating, by the smart sensor, the machine learning model based on feature data extracted from the sensor data; and
   repeatedly performing:
      sending, by the smart sensor, encrypted data associated with the machine learning model to a system on chip (SoC) of the headset;
      receiving, by the SoC, encrypted data associated with the machine learning model from one or more smart sensors;
      sending, by the SoC, encrypted data associated with the machine learning model collected from the one or more smart sensors to a server;
      receiving, by the SoC, parameters of a base machine learning model from the server, and
      sending, by the SoC, parameters of the base machine learning model to the smart sensor; and
      locally updating, by the smart sensor, the received base machine learning model based on the stored feature data.

12. The non-transitory computer readable storage medium of claim 11, wherein encrypted data associated with the machine learning model represents encrypted feature data.

13. The non-transitory computer readable storage medium of claim 11, wherein encrypted data associated with the machine learning model represents encrypted parameters of the updated machine learning model.

14. The non-transitory computer readable storage medium of claim 13, wherein the server generates the base model by aggregating parameters received from a plurality of artificial reality headsets.

15. The non-transitory computer readable storage medium of claim 11, wherein locally updating comprises calibrating the machine learning model for a specific user.

16. The non-transitory computer readable storage medium of claim 11, wherein smart sensors and SoC are part of an artificial reality headset.

17. The non-transitory computer readable storage medium of claim 11, wherein the server:
   receives encrypted features from a plurality of headsets,
   decrypts the encrypted features, and
   updates a base machine learning model based on the decrypted features.

18. The non-transitory computer readable storage medium of claim 11, wherein the parameters of the machine learning model are received from the server as part of an initial deployment.

19. The non-transitory computer readable storage medium of claim 11, wherein the SoC stores parameters received form one or more smart sensors for backup.

20. The non-transitory computer readable storage medium of claim 11, wherein one or more smart sensors include eye tracking sensors and hand tracking sensors.

* * * * *